United States Patent
Douiri et al.

(10) Patent No.: US 7,702,776 B2
(45) Date of Patent: Apr. 20, 2010

(54) OPERATING METHOD FOR A SERVER COMMUNICATING WITH A CLIENT

(75) Inventors: Badreddine Douiri, Stuttgart (DE); Thomas Gysser, Möglingen (DE); Frank Hackländer, Stuttgart (DE); Arno Pernozzoli, Gràtenberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/575,980

(22) PCT Filed: Oct. 13, 2004

(86) PCT No.: PCT/EP2004/011489

§ 371 (c)(1), (2), (4) Date: Jan. 25, 2007

(87) PCT Pub. No.: WO2005/038662

PCT Pub. Date: Apr. 28, 2005

(65) Prior Publication Data

US 2007/0271382 A1    Nov. 22, 2007

(30) Foreign Application Priority Data

Oct. 17, 2003   (DE)   ................ 103 49 015

(51) Int. Cl.
*G06F 15/173* (2006.01)
(52) U.S. Cl. ................ 709/224; 709/203; 715/781
(58) Field of Classification Search .............. 709/203, 709/227, 224; 715/760, 781
See application file for complete search history.

(56) References Cited

U.S. PATENT DOCUMENTS

| 5,708,780 | A | | 1/1998 | Levergood et al. |
| 5,774,670 | A | | 6/1998 | Montulli |
| 5,937,160 | A | * | 8/1999 | Davis et al. ................ 709/203 |
| 6,047,268 | A | | 4/2000 | Bartoli et al. |
| 6,313,855 | B1 | * | 11/2001 | Shuping et al. ............ 715/854 |
| 6,366,947 | B1 | * | 4/2002 | Kavner ..................... 709/203 |
| 6,456,307 | B1 | * | 9/2002 | Bates et al. ................ 715/838 |
| 6,915,482 | B2 | * | 7/2005 | Jellum et al. .............. 715/234 |
| 7,207,044 | B2 | * | 4/2007 | Laux et al. ................. 718/105 |
| 7,246,147 | B2 | * | 7/2007 | Kim et al. .................. 709/203 |
| 7,600,020 | B2 | * | 10/2009 | Busch et al. .............. 709/224 |

(Continued)

OTHER PUBLICATIONS

David Lane, Hugh E. Williams; "Web Database Applications with PHP & MySQL"; Mar. 2002; pp. 1-26; [Retrieved from internet at] http://www.oreilly.com/catalog/webdbapps/chapter/ch09.htlm; XP002283237.

*Primary Examiner*—Saleh Najjar
*Assistant Examiner*—Marie Georges Henry

(57) ABSTRACT

According to the invention, a server communicates with a client by transmitting to the client pages that the latter requested. The server adds to the pages identification data comprising at least one transmission identifier specific for the transmission of the page in such a manner that said data is transmitted back to the server if and only if the request on the client's end originates from the transmission of the page. The server also stores the identification data transmitted by it. If the transmission identifier transferred back to the server corresponds to a stored transmission identifier, the server, once it receives the additional request, stores the newly transmitted transmission identifier in place of the transferred-back transmission identifier. Otherwise, it stores it in addition to the transferred-back transmission identifier.

13 Claims, 3 Drawing Sheets

U.S. PATENT DOCUMENTS

| | | |
|---|---|---|
| 2002/0099936 A1 | 7/2002 | Kou et al. |
| 2002/0111879 A1* | 8/2002 | Melero et al. ................ 705/26 |
| 2002/0184632 A1* | 12/2002 | Reitmeier .................. 725/47 |
| 2003/0037108 A1* | 2/2003 | Peiffer et al. ............... 709/203 |
| 2003/0051022 A1* | 3/2003 | Sogabe et al. ............... 709/223 |
| 2004/0030719 A1* | 2/2004 | Wei ........................ 707/104.1 |
| 2004/0177327 A1* | 9/2004 | Kieffer ...................... 715/901 |
| 2004/0255240 A1* | 12/2004 | Udom et al. ................ 715/506 |

* cited by examiner

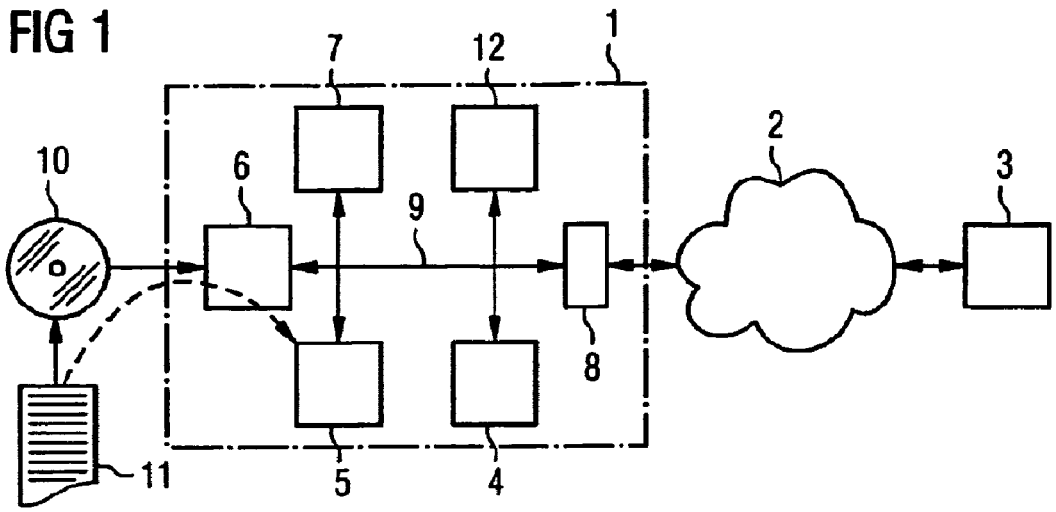
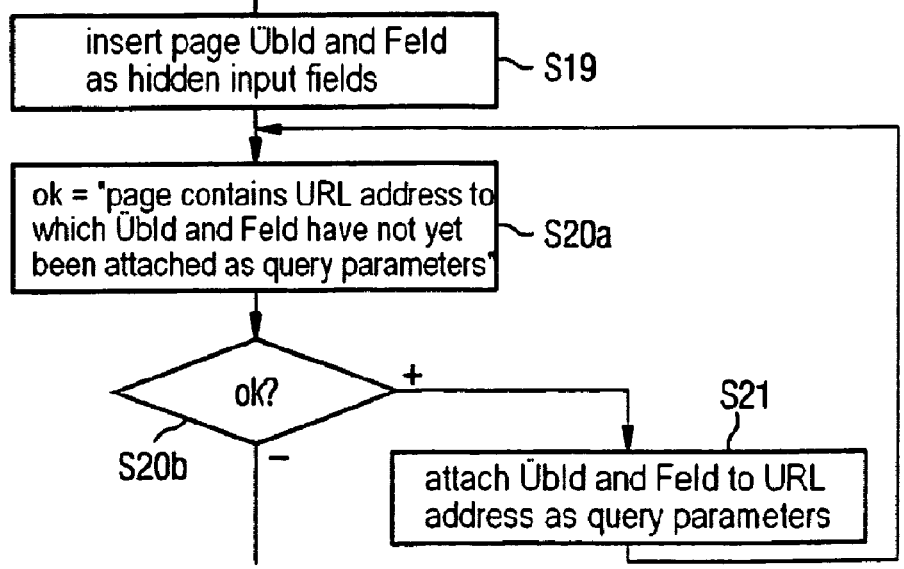

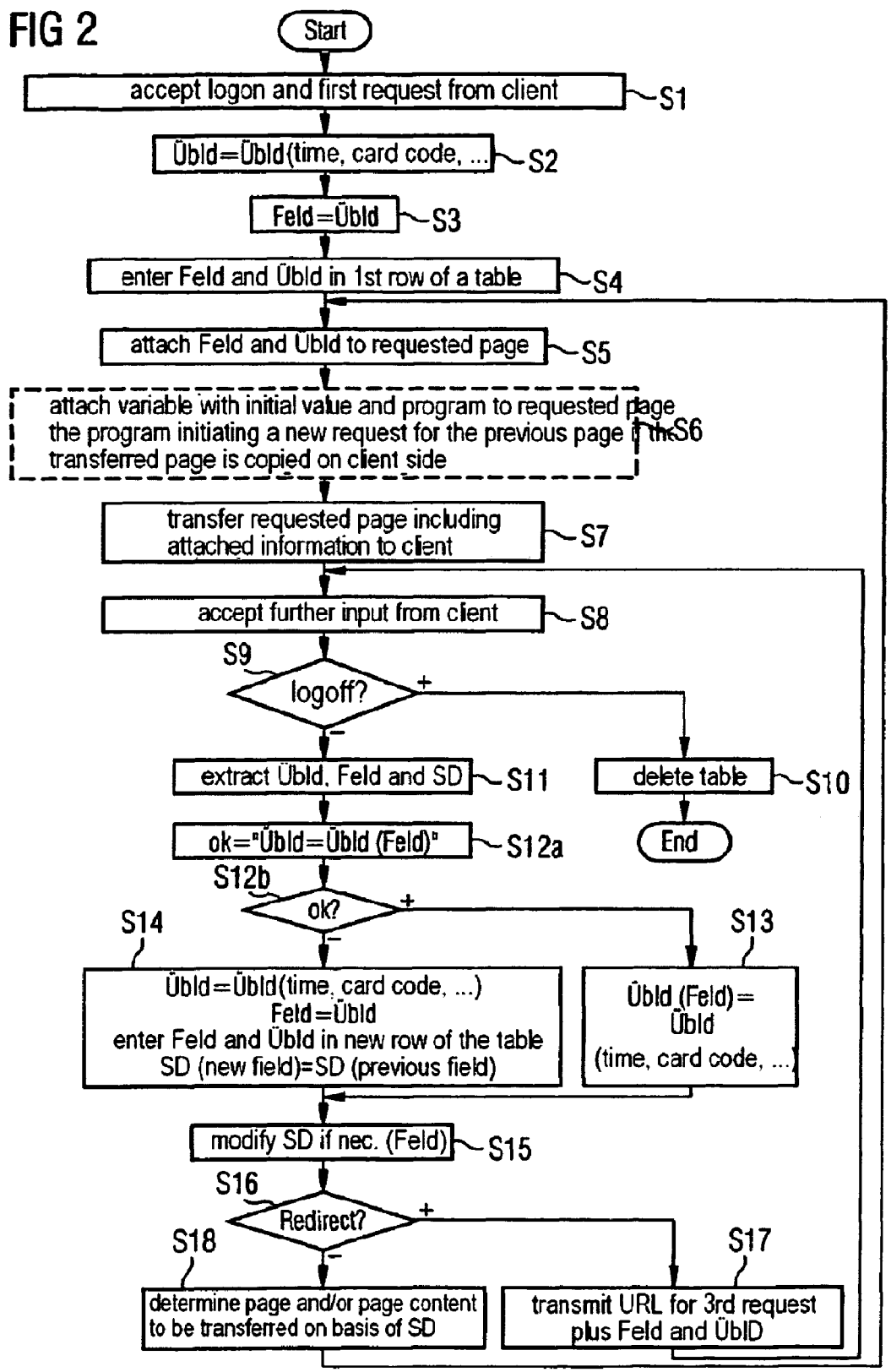

US 7,702,776 B2

OPERATING METHOD FOR A SERVER COMMUNICATING WITH A CLIENT

CROSS REFERENCE TO RELATED APPLICATIONS

This application claims priority to the German application No. 10349015.9, filed Oct. 17, 2003, and to the International Application No. PCT/EP2004/011489, filed Oct. 13, 2004 which are incorporated by reference herein in their entirety.

FIELD OF INVENTION

The present invention relates to an operating method for a server that communicates with a client, wherein the server, when a request for a page is transmitted to it by the client, transfers the requested page to the client.

The present invention also relates to a data medium having a computer program stored on the data medium for executing an operating method of said kind.

The present invention further relates to a server having a mass storage in which a computer program is stored, so that when the computer program is invoked by the server computer an operating method of said kind can be executed.

BACKGROUND OF INVENTION

Methods, computer programs and servers of the aforementioned kind are generally known. They are used in particular for web applications, e.g. for internet and intranet applications.

Web applications are relatively anonymous. The server and the client usually know very little of one another. In particular it is generally not possible for the server to determine easily on the basis of a request for a page from which client this request was transmitted to it and from which state of the clients the request was made. Consequently, each request addressed to the server must usually include full information about the requesting client and about the requested page.

In order nonetheless to be able to apply certain default settings on the server side within a session between server and client (e.g. a choice of a language that is always to be used subsequently), it is known in particular that the client logs on to the server at the start of the session and the server transmits an attachment file (referred to as a "cookie") to the client in addition to the requested page. The attachment file is appended by the client to every request addressed to this server. In other words it is transmitted back to the server by the client. In this case the attachment file is specific to the server. It is therefore transmitted in addition to the server by the client along with every request addressed to this server. The attachment file continues to be transmitted until either the attachment file is deleted on the client side or a new attachment file is transmitted by the server to the client, thereby overwriting the previous attachment file.

The preset default settings that are to be applied can be contained in the attachment file itself. Alternatively the attachment file can also contain a link to a memory area in the server. In this case the preset default settings are stored as such in the server, whereas in the first-mentioned case they are stored in the client.

The status of the session is usually bound to the session in the sense of the existence of the corresponding client-side communication program, e.g. an internet browser such as Internet Explorer from Microsoft. The prior art approach therefore operates without problems as long as the communication process is maintained on the client side and the communication with the server takes place via a single window.

SUMMARY OF INVENTION

However, it is generally known that it is possible to use multiple windows in parallel in one and the same internet browser. In the case of Microsoft's Internet Explorer, for example, multiple windows can be created by actuating the key combination "Control N" or by selecting the option "Open in new window". Even in this case the prior art still causes no problems if, although multiple windows are used on the client side, the same preset default settings are always used in all the windows.

However, the prior art approach falls down if multiple windows are being used on the client side and different preset default settings are to be applied in the different windows. The reason is that, as already mentioned, the server is not able to differentiate from which of the windows the particular request was transmitted to it. In this situation the use of the attachment file also does not help, for a new window on the client side is in fact just a separate window, but not a separate process. Consequently the windows use the same attachment files.

An object of the present invention consists in creating an operating method for a server, a computer program corresponding herewith and the corresponding server by means of which such preset default settings can be individually applied for each window on the client side.

The object is achieved by means of an operating method for a server which communicates with a client in that the server, when a request for a page is transmitted to it by the client, transfers the requested page to the client, that the server attaches identification data to the page in such a way that when a further request for a page is made by the client the identification data is transferred back to the server if and only if the request on the client side originates from this transfer of the page, that the identification data includes at least one transmission identifier specific to the transmission of the page, that the server stores the identification data transmitted by it, that the server, upon receiving the further request, stores the transmission identifier newly transmitted by it in place of the transferred-back transmission identifier if the transferred-back transmission identifier matches a stored transmission identifier, and that the server, upon receiving the further request, stores the transmission identifier newly transmitted by it in addition to the transferred-back transmission identifier if the transferred-back transmission identifier does not match any previously stored transmission identifier.

By means of this approach the server, although in fact still not able to recognize if a second window is opened on the client side (more on this later), can recognize if "obsolete" identification data is being transmitted to it by the client. On the basis of this circumstance, namely that the identification data is already obsolete or superseded, it can therefore recognize that a second window must have been opened. From the time of this recognition the server is therefore able to manage this second window separately from the first window.

In the simplest case the transmission identifier can be a sequential number or similar. Preferably, however, the transmission identifier is a globally unique identifier. For example, the transmission identifier can be what is referred to as a GUID. A GUID (global universal identifier) is formed on the basis of the server time—which is generally accurate to the nearest millisecond—and identification data of the server, for example a uniquely assigned identification number of the network card of the server or of the processor of the server.

By means of the approach according to the invention it is for example possible that selection data is assigned to the identification data and that if the transferred-back transmission identifier matches one of the stored transmission identifiers, the page newly transferred by the server to the client in response to the further request depends on the selection data assigned to the matching transmission identifier.

In the event that the transferred-back transmission identifier does not match any of the stored transmission identifiers, various approaches are possible. Thus, for example, a predefined start page can be transferred to the client. Preferably, however, the page newly transferred by the server to the client in response to the further request depends on the selection data assigned to one of the stored transmission identifiers. The server then, of course, also assigns this selection data to the additionally stored transmission identifier.

Preferably the identification data also includes a window identifier. If the transferred-back transmission identifier matches one of the stored transmission identifiers, the window identifier is retained in this case. If, on the other hand, the transferred-back transmission identifier does not match any of the stored transmission identifiers, the server assigns a new window identifier to the additionally stored transmission identifier.

As a result of this approach it is possible in particular to implement an efficient management of more than two client-side windows. Because of this approach, namely, it is possible for the server to recognize which window has been duplicated on the client side.

As a result of this approach it is also possible that in the event that the transferred-back transmission identifier does not match any of the stored transmission identifiers the page newly transferred by the server to the client in response to a further request depends on the selection data which is assigned to that one of the stored transmission identifiers whose window identifier matches the transferred-back window identifier.

In the simplest case the new window identifier can—analogously to the transmission identifier—once again be a sequential number. Preferably, however, it too is embodied as a GUID. In this case it can be embodied alternatively as an independently generated GUID or be identical to the transmission identifier generated immediately beforehand.

The server manages the identification data preferably in the form of a table which contains, in each row, the entries window identifier, transmission identifier and selection data. Instead of the selection data itself, a link (=pointer) to the selection data can, of course, also be stored in the table.

The checking sequence (first the transmission identifier or first the window identifier) is in principle left to the discretion of the person skilled in the art. Preferably, however, the window identifier will be checked first, and then the transmission identifier stored for this window identifier. The reason for this is that the window identifier transferred back by the client is always stored. The transmission identifier transferred back by the client, on the other hand, could already have been overwritten.

With web applications, basically two types of request transmission are known, namely what are referred to as Post requests and what are referred to as Get requests.

Post requests are based on the principle that the client fills out input fields of the page and then the filled-out input fields are transferred back to the server by the client. With Post requests all the input fields are always transferred back to the server by the client. The transmitted data includes, among other information, the request for the new page. For an orderly server-side handling of such Post requests in accordance with the present invention it is therefore possible, for example, that the server attaches the identification data to the transferred page as hidden input fields that are not displayed as well on the client side. According to the invention, therefore, hidden input fields are attached to the page which are not displayed as well when the page is displayed in the customary manner in a window of the client. The identification data has already been stored in advance in these input fields on the server side. They are therefore transferred back to the server by the client when the client sends a Post request.

With Get requests, on the other hand, a link address, usually what is referred to as a URL, is immediately transferred back by the client to the server. In this case the link address is part of the previously transferred page and is displayed as such along with the page in the window in which the client displays the page. If the user of the client selects this link address, the link address itself represents an immediate request for a further page.

If the page contains at least one such address for a further page, an orderly server-side handling of such a Get request in accordance with the present invention can be achieved by the server attaching the identification data to the transferred page as parameters, referred to as query parameters, assigned to the address.

A special instance of a response by the server to the receipt of a request is what is referred to as a server-side Response Redirect. A server-side Response Redirect is present when the server, in response to a request transmitted to it, does not transfer the requested page to the client, but upon receiving the further request initially transmits a third request to the client, which request is to be sent by the client back to the server. The server then transfers the requested page only in response to the transmission of the third request to the server. In this case there are two possibilities of guaranteeing an orderly handling of the request in accordance with the present invention on the server side.

On the one hand it is possible that the server attaches the identification data to the third request as assigned parameters. In this case the identification data is attached to the request itself. Alternatively it is also possible that the server attaches the identification data to the third request as an attachment file which is not transferred back by the client to the server with the third request. In this case, therefore, the server attaches the identification data to the third request as what is referred to as a transfer cookie. In this situation, as also in the case of Post requests, the identification data is attached to the page as hidden data. The program extracts the identification data and inserts it into the attachment file. In addition, the server transmits a delete command for this attachment file to the client together with the page which it transfers to the client in response to the third request.

There are languages in which programs can be attached to the pages transferred by the server to the client or, alternatively, the programs can be embedded in these pages. An example of a language of this kind is JavaScript. In this case there is a further way to guarantee that the identification data is transmitted together with the request from the client to the server. For in this case it is possible for the server to attach the identification data to the page by attaching to the page a program on account of which the client attaches an attachment file containing the identification data to a request for a page if and only if the request originates from this transfer of the page.

Thus, a so-called transfer cookie is generated in this case also. In contrast to the Response Redirect, however, the transfer cookie is generated, not on the server side, but on the client side.

The server cannot recognize immediately if a page already transferred to the client is duplicated on the client side. Therefore, if the user of the client duplicates a page and thereafter works for a relatively long time with only one of the two versions of the duplicated page, but does not change the other version of the duplicate d page, this other version remains unchanged for the present. If the user of the client then sends a request to the server at a much later time from the other, still unchanged, version of the duplicated page, in this case the server takes over the selection data that is assigned to the changed version of the duplicated page at this time. However, the selection data may already have been substantially changed at this time. It can therefore be relatively complicated for the user to restore the status of the other version of the duplicated page which is actually wanted by the user. For this reason it is of advantage to recognize as early as possible if a page already transferred to the client is duplicated on the client side.

An immediate recognition of a duplication of this kind is possible in that the server also attaches to the page a variable with an initial value and a program that is to be executed by the client when the page is displayed in a window, that on account of the program the client modifies the value of the variable if it has the initial value, and that on account of the program the client repeats the previous request for the transfer of the page, so that the client, if the variable does not have the initial value, transmits the identification data transmitted with the previous request to the server a second time.

For then the client repeats the previous request immediately if the page is duplicated, with the result that the server can immediately recognize the duplication as such. With this approach, although the server also (mistakenly) recognizes a duplication if the user of the client only updates the page—without duplicating it—or reverts to a page that is still stored on the client side but is no longer displayed in this window. This is not critical, however, since in this case only one window is being managed on the server side, and in reality this window does not even exist on the client side. On the other hand it cannot happen that a window is duplicated on the client side and the server does not recognize this. In this case the request can be transmitted to the server in the form of a Post request or in the form of a Get request, dependent on the specific application. This also applies if the page was loaded for the first time in response to a Post request.

The operating method according to the invention is implemented as a computer program which is supplied to the server. In this case the computer program is supplied to the server via a data medium. Examples of a data medium of this kind are a CD-ROM or a streamer cartridge. The computer program is stored on the data medium in (exclusively) machine-readable form. At the same time the computer program can be stored on the data medium alternatively in compressed or in uncompressed form.

The data medium with the computer program stored thereon is introduced into a reader device by means of which the server can read the computer program stored on the data medium. It therefore reads the computer program from the data medium and stores it in a mass storage, for example on a hard disk. When the computer program is called from the hard disk (alternatively also from the data medium), the server is therefore able to execute the operating method according to the invention.

BRIEF DESCRIPTION OF THE DRAWINGS

Further advantages and details will emerge from the following description of an exemplary embodiment in conjunction with the drawings, in which:

FIG. 1 shows a computer network,
FIG. 2 shows a flowchart,
FIG. 3 shows a table, and
FIG. 4 to 7 show further flowcharts.

DETAILED DESCRIPTION OF INVENTION

Figure 5:
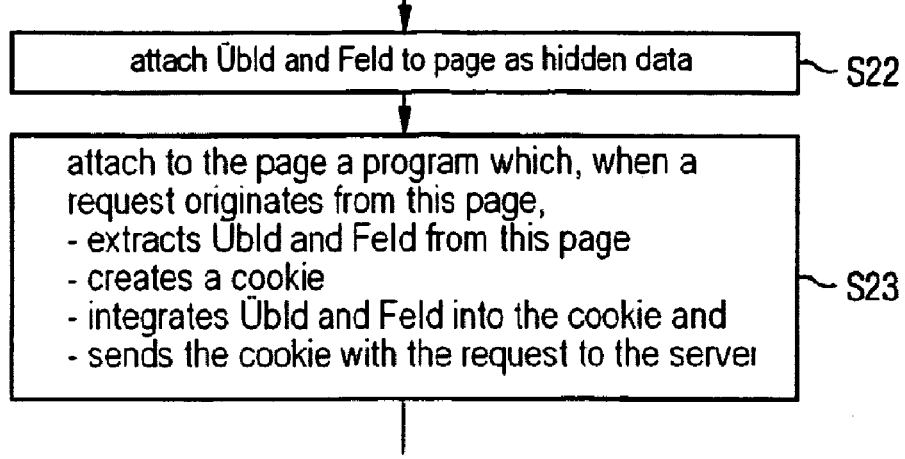

According to FIG. 1, a server 1 is connected to a client 3 via a computer-to-computer link 2 for data communication purposes. In this arrangement the computer-to-computer link 2 can be embodied in various ways. Generally, however, it is embodied as an internet or intranet connection. The server 1 and the client 3 can communicate with each other via the computer-to-computer link 2 in accordance with a web protocol.

The server 1 has, as is generally customary, a number of components 4 to 8 which are connected to one another via a bus 9. The components 4 to 8 comprise in particular a processor 4, a mass storage 5 (typically one or more hard disks), a reader device 6, a timer 7, and a network card 8.

A data medium 10 on which a computer program 11 is stored in exclusively machine-readable form can be introduced into the reader device 6. Said computer program 11 is read from the data medium 10 and stored, as indicated by the dashed line in FIG. 1, in the mass storage 5. When the computer program 11 is called, the server 1 is therefore able to execute the computer program 11. When the computer program 11 is called, the server 1 executes an operating method which is described in more detail below in conjunction with FIG. 2.

According to FIG. 2, in a step S1 the server 1 accepts a logon from the client 3 and a first request for a page. In a step S2 the server 1 thereupon determines a transmission identifier ÜbId. The transmission identifier ÜbId is in this case preferably globally unique. It can consist, for example, of a combination of the time output by the timer 7 and of the code of the network card 8 and/or the processor 4.

In a step S3 a window identifier FeId is then set equal to the transmission identifier ÜbId just determined. The two identifiers ÜbId, FeId are then—see FIG. 3 in addition—entered in the first row of a table 12. According to FIG. 3, in this case each row of the table 12 can also be assigned selection data SD in addition to the two identifiers ÜbId, FeId. The meaning of the selection data SD will be dealt with in the following.

In a step S5 the server 1 attaches the identification data FeId, ÜbId to the requested page. In this case the attachment is performed in such a way that if a further request for a page is made by the client 3 the identification data FeId, ÜbId is transferred back to the server 1 if and only if the request originates from the transfer of this page on the client 3 side.

According to a step S6 the server 1 also attaches a variable and a program to the requested page. The variable has an initial value. The program is embodied such that it initiates a new request for the previous page if the transferred page is copied on the client side. This will be dealt with in greater detail later. Step S6 is only optional here and is therefore represented only by a dashed outline in FIG. 2. In a step S7 the server 1 then transfers the requested page including the information attached to this page to the client 3. The attached information comprises in particular the two attached identifiers ÜbId, FeId, their supplements, as well as the variable and the program.

In a step S8 the server 1 accepts a further input from the client 3. The server 1 thereupon checks first in a step S9 whether the client 3 has logged off. If this is the case, in a step S10 the server deletes the table 12 and terminates the execution of the method.

If the input in step S8 was not a logoff, then it was a new request. In this case the server 1 extracts the transferred-back identifiers ÜbId, FeId and the selection data SD from the transmitted request.

In a step S12 the server 1 then checks whether the transferred-back transmission identifier ÜbId matches the transmission identifier ÜbId which is assigned to the transferred-back window identifier FeId in the table 12. For the sake of better clarity, step S12 in FIG. 2 is in this case subdivided into two sub-steps S12a, S12b. In sub-step S12a a logical variable is set in accordance with the check to be performed, and in sub-step S12b the logical variable is interrogated.

If a match was established in step S12, the request transmitted by the client 3 originates from a window of the client 3 already acquired and managed on the server side. In this case, in a step S13 analogous to step S2, a new transmission identifier ÜbId is determined and stored in the table 12 in the row in which the transferred-back window identifier FeId is also stored. The server 1 therefore stores the newly determined transmission identifier ÜbId in place of the transferred-back transmission identifier ÜbId in the table 12.

If, on the other hand, no match was established in step S12, a step S14 is executed. In step S14 the transmission identifier ÜbId is likewise newly determined in an analogous manner to the approach of step S2. Then, however, the window identifier FeId is set—analogously to step S3—equal to the transmission identifier ÜbId just newly determined. The two identifiers FeId, ÜbId are entered by the server 1 in a new row of the table 12. In addition, as part of step S14, the selection data SD which is assigned to the transferred-back window identifier FeId is copied into the now newly filled row of the table 12.

If the server 1 has received new selection data SD, in a step S15 it additionally modifies the selection data SD which is assigned to the current window identifier FeId. Depending on whether, as a result of the check in step S12, step S13 or step S14 has been executed, the data in this case is the transferred-back window identifier FeId or the newly determined window identifier FeId.

In a step S16 the server 1 checks next whether it can transfer the requested page directly or whether it must perform what is referred to as a Response Redirect. If it has to perform a Response Redirect, it executes a step S17 in which it transmits a new address, usually a URL address, in addition to the current window identifier FeId and the current transmission identifier ÜbId to the client 3. It then branches back to step S8.

Otherwise, the server 1 determines, on the basis of the selection data assigned to the current window identifier FeId and the current transmission identifier ÜbId in the table 12, which page is to be transferred to the client 3. Alternatively or in addition the contents of the page can also be modified. The server 1 then branches back to step S5.

FIG. 4 shows a first way to attach the identification data ÜbId, FeId to the page that is to be transferred. According to FIG. 4, in a step S19 the server 1 first attaches the identifiers ÜbId, FeId to the page as hidden input fields. This produces the effect that the identifiers ÜbId and FeId are transmitted from the client 3 to the server 1 with each Post request of the client 3 which originates from this page.

In a step S20 the server 1 then checks whether the page to be transmitted includes a URL address to which the identifiers ÜbId and FeId have not yet been attached as query parameters. If this is the case, the server 1 executes a step S21 in which it attaches the identifiers ÜbId and FeId as query parameters to this address. From step S21 the server then returns to step S20. In this case step S20 in FIG. 4—analogously to step S12 in FIG. 2—is subdivided into two sub-steps.

FIG. 5 shows a further possibility of attaching the identification data ÜbId, FeId to the page. According to FIG. 5 the server 1 attaches the identifiers ÜbId and FeId to the page as hidden data. In this case the data—analogously to step S19 of FIG. 4—can be hidden input fields, although this is not mandatory. The server 1 then attaches to the page a program which will be executed when a request originating from this page is made by the client 3. On account of the program the client 3 then extracts the identification data ÜbId, FeId from this page and integrates it into a cookie that is to be created by it. The client 3 sends the cookie together with the request to the server 1.

Figure 6:
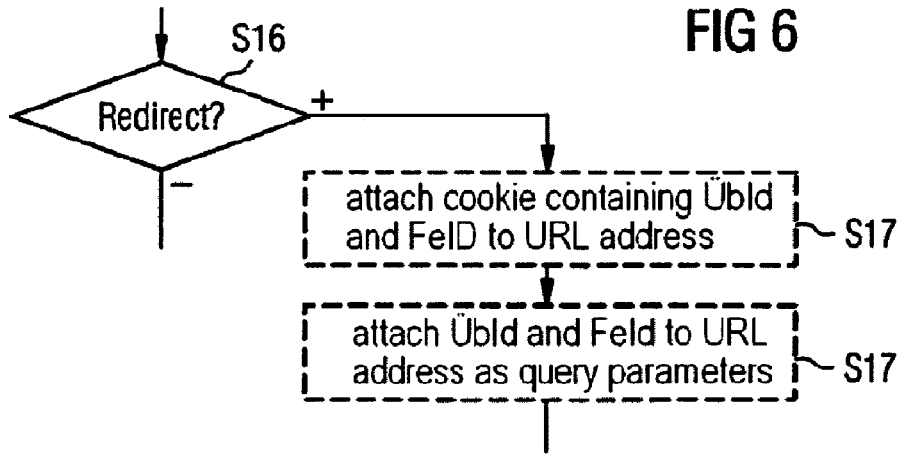

FIG. 6 shows the possibilities that exist in order to implement step S17 of FIG. 2, in which the identifiers FeId and ÜbId are attached to the URL to be transmitted. According to FIG. 6 it is possible to embody step S17 in such a way that the identifiers ÜbId and FeId—analogously to step S21 of FIG. 4—are attached as query parameters to the URL address. Alternatively it is possible that in step S17 the server 1 attaches an attachment file (cookie) containing the identifiers ÜbId, FeId to the URL address. In this latter case the information attached to the requested page in step S7 (see FIG. 2) to the client 3 should include a delete command on account of which this attachment file is deleted again immediately on the client 3 side.

Of the steps S17 shown in FIG. 6, only one is ever executed. The two steps S17 are therefore represented by dashed outlines in FIG. 6.

Figure 7:
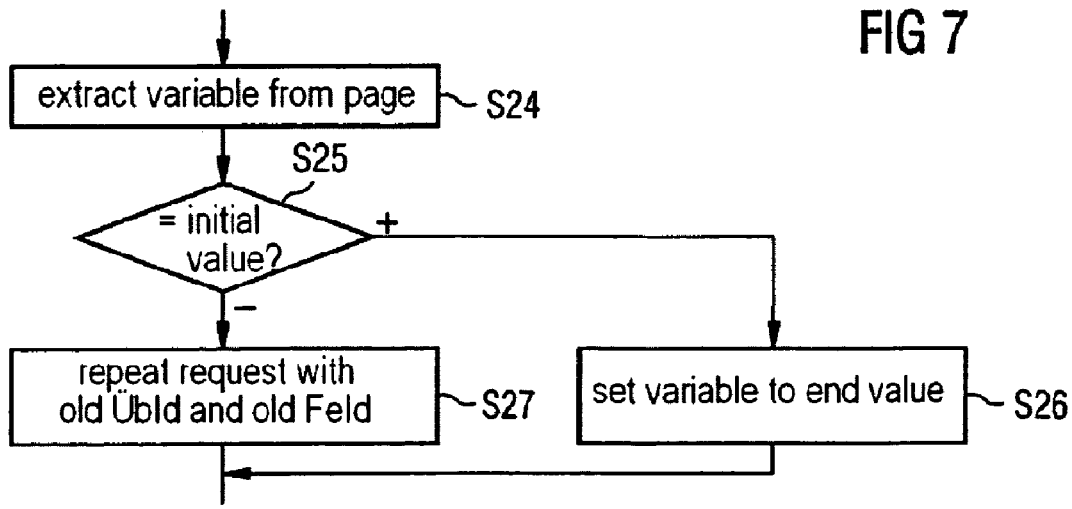

FIG. 7 now shows for the sake of completeness the method which the client 3 executes on account of the program which is attached to the requested page by the server 1 in the course of step S6 (see FIG. 2). In this case the program is always executed by the client 3 when the page is displayed by it in a window. The program is therefore executed both when the client 3 first receives the page and when the client 3 duplicates the page, for example by means of "Control N".

According to FIG. 7 the client 3 first extracts the transmitted variable from the page. In a step S25 it then checks whether the variable still has its initial value. If this is the case, in a step S26 it sets the variable to its end value. In this case the end value must, of course, be different from the initial value. Apart from this it can be chosen arbitrarily. If the check in step S25 did not result in a match, the client 3 executes a step S27 in which it repeats the previous request. In this case repeating the request causes in particular the identification data ÜbId, FeId already transferred back to the server 1 to be transferred a second time to the server 1. As a result the server 1 is then immediately able to recognize that a new window has been opened on the client side.

By means of the operating method according to the invention it is therefore easily possible for the server 1 to individually manage a plurality of windows of the client 3.

The invention claimed is:

1. A method of operating a server communicating with a client, comprising:
opening by the client a plurality of window instances individually selectable with distinct operational settings for accessing Web pages;

receiving from the client a first Web page request from a first window instance of the plurality of window instances;

attaching first page identification data to a first page corresponding to the first page request, by the server;

transmitting the first page including the first page identification data to the client, by the server;

receiving a second Web page request from the client, the second page request including a transmission of the first page identification data back to the server only if the second Web page request originates from the first window instance, the first page identification data including at least one specific transmission identifier for identifying the first window instance;

storing the transmitted first page identification data by the server;

attaching second page identification data to a second page corresponding to the second page request, by the server, wherein the second page identification data includes at least one further specific transmission identifier for identifying a second window instance, wherein the operational settings of the second window instance are different from the operational settings of the first window instance;

transmitting the second page including the second page identification data to the client, by the server;

storing the transmitted second page identification data by the server, if the first page identification data transmitted back to the server are identical to any previously stored page identification data;

storing the transmitted second page identification data and the first page identification data, if the first page identification data transmitted back to the server are not identical to any previously stored page identification data;

comparing the respective transmission identifiers to identify a respective window instance from which a Web page request has been made; and based on the results of the comparing, applying operational settings appropriate to the respective window instance.

2. The method as claimed in claim 1, further comprising:
assigning selection data to the first and second page identification data; and
transmitting the second page to the client based upon the selection data assigned to the first page identification data, if the specific transmission identifier included in the first page identification data transmitted back to the server is identical to a transmission identifier included in any previously stored page identification data.

3. The method as claimed in claim 2, wherein, if the specific transmission identifier included in the first page identification data transmitted back to the server is not identical to a previously stored transmission identifier included in any previously stored page identification data,
the second page is transmitted based upon the selection data assigned to one of the specific transmission identifiers included in any of the previously stored page identification data, and
the server assigns the selection data assigned to the one specific transmission identifier to the specific transmission identifier included in the first page identification data transmitted back to the server.

4. The method as claimed in claim 1, wherein
the first and second page identification data include a window identifier related to the first respectively a further window instance,
the server maintains the window identifier, if the specific transmission identifier included in the first page identification data transmitted back to the server is identical to a transmission identifier included in any previously stored page identification data, and
the server assigns an updated window identifier to the specific transmission identifier included in the first page identification data, if the specific transmission identifier included in the first page identification data transmitted back to the server is not identical to a transmission identifier included in any previously stored page identification data.

5. The method as claimed in claim 4, wherein, if the specific transmission identifier included in the first page identification data transmitted back to the server is not identical to any transmission identifier included in any previously stored page identification data, the second page is transmitted based upon the selection data assigned to such page identification data having a transmission identifier including such window identifier being identical to the window identifier included in the back-transmitted first page identification data.

6. The method as claimed in claim 1, wherein the server attaches the first and second page identification data to the first respectively second page as hidden input fields which are not displayed when displaying the respective page.

7. The method as claimed in claim 1, wherein
the first or second page includes at least one address pointing to a further page, and
the server attaches the first respectively second page identification data as parameters assigned to the respective transmitted page.

8. The method as claimed in claim 1, wherein the server attaches the first or second page identification data to the first respectively second page by attaching a software program to the respective page, the software program configured to attach on the client side to the second page request an attachment file having the second page identification data if the second page request originates from the first window instance.

9. The method as claimed in claim 1, wherein
the server attaches to the first or second page a variable having a current value and a program for execution by the client upon displaying the respective page in a window,
the client upon executing the program modifies the current value of the variable if the current value corresponds to an initial value of the variable, and
the client upon executing the program repeats the first respectively second page request such that the first respectively second page identification data are back-transmitted to the server, if the current value does not correspond to the initial value of the variable.

10. A computer readable medium encoded with a software program for operating a server communicating with a client, wherein when the software program is executed the operation of the server comprises:
opening by the client a plurality of window instances individually selectable with distinct operational settings for accessing Web pages;
receiving from the client a first Web page request from a first window instance of the plurality of window instances;
attaching first page identification data to a first page corresponding to the first page request;
transmitting the first page including the first page identification data to the client;
receiving a second Web page request from the client, the second page request including a transmission of the first page identification data back to the server only if the second Web page request originates from the first window instance, the first page identification data including at least one specific transmission identifier for identifying the first window instance;

storing the transmitted first page identification data;

attaching second page identification data to a second page corresponding to the second page request, wherein the second page identification data includes at least one further specific transmission identifier for identifying a second window instance, wherein the operational settings of the second window instance are different from the operational settings of the first window instance;

transmitting the second page including the second page identification data to the client;

storing the transmitted second page identification data, if the first page identification data transmitted back to the server are identical to any previously stored page identification data;

storing the transmitted second page identification data and the first page identification data, if the first page identification data transmitted back to the server are not identical to any previously stored page identification data; and comparing the respective transmission identifiers to identify a respective window instance from which a Web page request has been made; and based on the results of the comparing, applying operational settings appropriate to the respective window instance.

11. A server for establishing a communication with a client, the server comprising a bulk storage memory having a software program for operating the server, wherein when the software program is executed the operation of the server comprises:

opening by the client a plurality of window instances individually selectable with distinct operational settings for accessing Web pages;

receiving from the client a first Web page request from a first window instance of the plurality of window instances;

attaching first page identification data to a first page corresponding to the first page request;

transmitting the first page including the first page identification data to the client;

receiving a second Web page request from the client, the second page request including a transmission of the first page identification data back to the server only if the second Web page request originates from the first window instance, the first page identification data including at least one specific transmission identifier for identifying the operational settings of the first window instance;

storing the transmitted first page identification data;

attaching second page identification data to a second page corresponding to the second page request, wherein the second page identification data includes at least one further specific transmission identifier for identifying the operational settings of a second window instance, wherein the operational settings of the second window instance are different from the operational settings of the first window instance;

transmitting the second page including the second page identification data to the client;

storing the transmitted second page identification data, if the first page identification data transmitted back to the server are identical to any previously stored page identification data;

storing the transmitted second page identification data and the first page identification data, if the first page identification data transmitted back to the server are not identical to any previously stored page identification data;

comparing the respective transmission identifiers to identify a respective window instance from which a Web page request has been made; and based on the results of the comparing, applying operational settings appropriate to the respective window instance.

12. The method as claimed in claim 1, further comprising:
the server, upon receiving the second request, first transmits a third request to the client, which third request is to be sent back by the client to the server, wherein the server attaches the identification data to the transmitted third request as assigned parameters.

13. The method as claimed in claim 1, further comprising:
the server, upon receiving the second request, first transmits a third request to the client, which third request is to be sent back by the client to the server, wherein the server attaches the identification data to the transmitted third request as an attachment file, wherein the server transmits a delete command for this attachment file to the client together with a page transferred to the client in response to the third request being sent back by the client to the server.

* * * * *